United States Patent Office 3,430,418
Patented Mar. 4, 1969

3,430,418
SELECTIVE ADSORPTION PROCESS
John L. Wagner, Lackawanna, N.Y., assignor to Union Carbide Corporation, a corporation of New York
Filed Aug. 9, 1967, Ser. No. 659,381
U.S. Cl. 55—25                          9 Claims
Int. Cl. B01d 53/04

ABSTRACT OF THE DISCLOSURE

An adiabatic pressure swing process for selectively absorbing components such as carbon dioxide, water and light aliphatic hydrocarbons from admixture with hydrogen gas is provided by at least four adsorbent beds joined in a particular flow sequence.

BACKGROUND OF THE INVENTION

This invention relates to a process for separating gas mixtures having selectively adsorbable components, as for example, CO, $CO_2$, $CH_4$ and other light saturated or unsaturated hydrocarbons, $NH_3$, $H_2S$, A, $N_2$ and $H_2O$ from hydrogen.

Adiabatic pressure swing adsorption processes are well-known for separating gas mixtures having selectively adsorbable components. One of the important limitations of these processes is the loss of unadsorbed product. This loss may result from rejection of the void space gas after the adsorption step, or from the use of purified product to purge the adsorbent beds for reuse. Furthermore, pressure energy is lost if the beds are purged of adsorbables with the product gas at low pressure.

Energy lost in the purge gas can be reduced by substituting a portion of the blowdown gas as purge. As taught in Kiyonaga U.S. Patent 3,176,444 at least the initial portion of the blowdown is conducted in a direction cocurrent to the preceding feed gas flow. However, previously proposed processes, for example that of Marsh et al. U.S. Patent 3,142,547, entail a severe penalty because a large surge tank is required to store sufficient gas volume for effective purging. This vessel is not only expensive but its space occupancy is also undesirable especially in small-size shippable plants.

The maximum pressure at which the purge gas can be stored is the terminal pressure of the cocurrent blowdown step. On the other hand, the more gas which is withdrawn from the bed for storage, the lower will be its storage pressure. Salvaging additional purge requires that the storage vessel size must increase not only to accommodate the incremental mass of gas but also to accommodate the lower storage pressure of the entire contents. If only a small quantity of purge gas is salvaged at a relatively high intermediate pressure, then the vessel may be kept small. However, when high purity product is required, such small quantity of purge may be insufficient to clean the adsorbent bed. The prior art has proposed to use valuable pure product at high pressure as supplemental purge to clean the bed—an expensive solution.

Another disadvantage of prior art pressure swing processes is that the product is delivered at varying flow rate and fluctuating pressure. Such changes in rate and pressure are caused by the intermittent use of a product portion for purge or repressurization of the cleaned adsorbent. The changes occur even if a sufficient number of beds is provided so that one bed is always producing product. Such variations in product conditions are unsatisfactory for many associated product-consuming processes, and still more surge tankage is required to smooth the flow.

It is an object of this invention to provide an adiabatic pressure swing process for selectively absorbing at least one component from feed gas mixture which minimizes loss of unadsorbed product.

Another object is to provide a process which eliminates the need for blowdown gas storage tanks.

An additional object is to provide a process characterized by both very high unadsorbed product purity and high percent recovery from the feed.

Still another object is to provide a process in which the unadsorbed product is delivered at substantially constant flow rate and pressure.

Other objects and advantages of this invention will be apparent from the ensuing disclosure and appended claims.

SUMMARY

This invention relates to an adiabatic pressure swing process for adsorbing at least one selectively adsorbable component from feed gas mixture.

At least four beds of selective adsorbent material are provided, each with an inlet end and discharge end. The feed gas mixture is introduced to the first bed inlet end at a first highest superatmospheric pressure for there-through with selective adsorption of at least one component, and for discharge of unadsorbed product effluent from the discharge end. This flow is continued so that an adsorption front of the one component is established at the inlet end and moves progressively toward the discharge end as the adsorbate loading increases. Flow is terminated when the adsorption front is still entirely within the first bed—before breakthrough. This means that the bed is only partially loaded with adsorbate, and the section between the front and the discharge end is substantially free and clean of the adsorbate.

Next a part of the void space gas (between the individual adsorbent particles) is released from the first bed discharge end cocurrent to the preceding feed gas mixture flow. This released gas is flowed directly (without intermediate storage) into the discharge end of a second adsorbent bed previously cleaned of the one component, and initially at a lower pressure. Releasing gas from the first bed reduces its pressure, and admitting the gas to the second bed increases its pressure. The first bed void gas release and the second bed countercurrent repressurization flows are continued until the two beds are substantially pressure equalized at a second intermediate pressure. This may be termed the equalization step, and during same the one component adsorption front moves closer toward the first bed discharge end without reaching it.

In the succeeding step further void space gas is released from the first bed discharge end cocurrent to the preceding feed gas mixture flow. This further released gas is throttled to the lowest pressure of the process and introduced to the discharge end of another adsorbent bed partially loaded with the adsorbable one component for flow therethrough and purging of the one component. These flows are continued until the first bed is at a third lower-than-intermediate pressure and the other bed receiving the purge gas is partially cleaned of the one component. This may be termed the cocurrent depressurization step of the first bed and the purging step of the other bed. It should be recognized however cocurrent depressurization of the first bed also occurs during the preceding equalization step.

Now the pressure of the first bed is reduced through the inlet end thereby countercurrently desorbing part of the adsorbed one component and discharging same through the inlet end. This countercurrent depressurization or blowdown step is continued until the first bed is at the lowest pressure of the process, e.g. substantially atmospheric. Alternatively the lowest pressure level may be super-atmospheric or sub-atmospheric (vacuum).

Then gas released from still another adsorbent bed in a cocurrent depressurization step analogous to the previously described first bed cocurrent depressurization step is introduced to the discharge end of the first bed for flow therethrough countercurrent to the previously flowing gas mixture and at the lowest pressure. This is the first bed purging step which is continued until most of the remaining one component has emerged through the bed inlet end. It should be noted that the cocurrent depressurization gas does not meet product specifications as it contains at least several times the adsorbable component concentration present in the product effluent. This is due to the former's lower pressure and possible breakthrough of the adsorbable component during cocurrent depressurization. Pressure reduction may for example contribute a 2–4 factor increase in adsorbable concentration and if breakthrough occurs it may add a 10–1,000 factor increase as compared to the product. However the composition of the cocurrent depressurization gas is more similar to the product than the feed gas.

After the purging step, pressure equalization gas from the second adsorbent bed and product effluent from the other bed is introduced to the first bed's discharge end for countercurrent repressurization. This equalization gas is identical in content to the gas released from the first bed in the previously described pressure equalization step. Its makeup is practically identical to that of the product effluent (although at lower pressure) because the one component is removed therefrom by selective adsorption in the initially clean section of the adsorbent bed as the gas flows thereacross during the cocurrent depressurization. The equalization gas is usually of higher purity than the previously described cocurrent depressurization gas.

This countercurrent repressurizaiton step is continued until the first bed pressure has risen from the lowest pressure to a higher pressure approaching the highest pressure of the feed gas mixture. The last part of the repressurization is performed only with the product effluent. This insures that the bed discharge end will be free of the one selectively adsorbable component and none of the latter will appear in the product effluent when the bed is returned to the adsorption step.

Finally the feed gas mixture is reintroduced to the inlet end of the repressurized first bed in a manner analogous to the previously described adsorption step, and the steps are consecutively repeated. During the period between first bed adsorption steps, the aforementioned still another, second and other beds are consecutively passed through the same sequence of steps.

This process has been used to separate gas mixtures containing hydrogen as the major component along with selectively adsorbable minor components such as light aliphatic hydrocarbons, carbon monoxide, carbon dioxide, and water. It has produced very high hydrogen recoveries along with extremely high purities, this combination of high performance being far above that attained with prior art adiabatic pressure swing processes. The process has also demonstrated remarkably stable product pressure—a fluctuation of only 5–10% which permits product flow directly to the suction of a compressor without surge tankage.

DESCRIPTION OF THE PREFERRED
EMBODIMENTS

Figure 1:
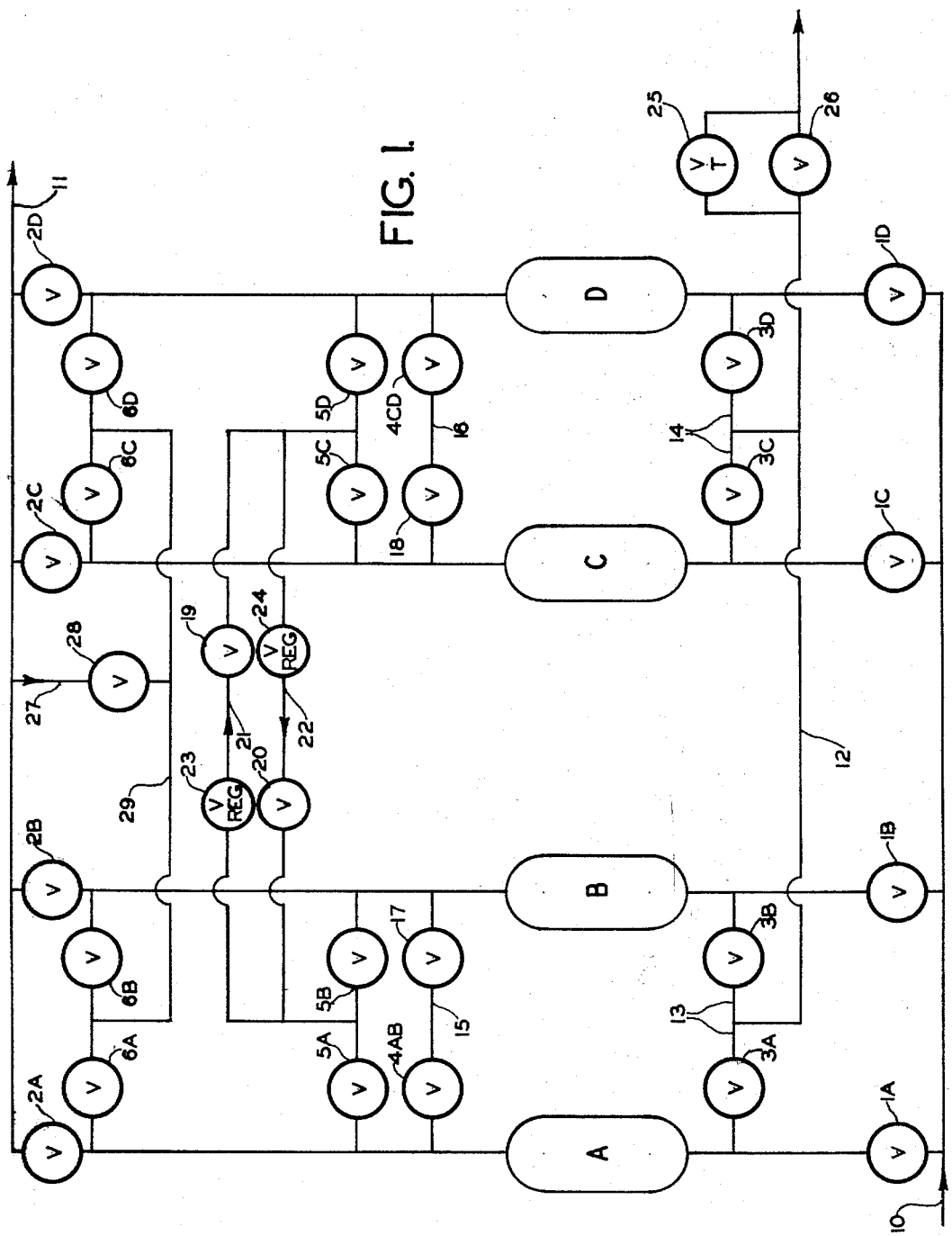
FIG. 1 is a schematic flowsheet of apparatus suitable for practicing the inventive process with four adsorbent beds.

Referring now to the drawings FIG. 1 shows four adsorbent beds A, B, C and D connected in parallel flow relation between feed gas mixture manifold 10 and unadsorbed product effluent gas manifold 11. Automatic valves 1A, 1B, 1C and 1D direct feed gas flow respectively to first bed A, second bed B, third bed C (equivalent to the "other" bed in the summary) and fourth bed D (equivalent to "still another" bed in the summary). Automatic valves 2A, 2B, 2C and 2D respectively direct product gas from the same beds into product manifold 11.

The adsorbed components are rejected by countercurrent depressurization and purge through waste manifold 12 at the inlet end of the beds. Adsorbers A and B are joined at their inlet ends to waste manifold 12 by conduit 13 having automatic valves 3A and 3B therein. Similarly adsorbers C and D are joined to waste manifold 12 at their inlet ends by conduit 14 having automatic valves 3C and 3D therein.

Equalization conduit 15 is provided joining the discharge ends of adsorbers A and B; similarly equalization conduit 16 is provided joining the discharge ends of adsorbers C and D. To provide pressure equalization, automatic valves 4AB and 4CD are located in conduits 15 and 16 respectively. Valves 17 and 18 in series with equalization valves 4AB and 4CD respectively are manual preset throttling devices which prevent excessively high flow rates from occurring and which allow adjustment and balancing of equalization rates between the adsorption bed pairs AB and CD.

Automatic valves 5A, 5B, 5C and 5D are provided at the discharge ends of the beds, two of which open together to pass cocurrent depressurization gas from one adsorbent bed for use as purge gas in another bed. Manual valves 19 and 20 in the purge cross-over conduits 21 and 22 respectively serve the same purpose as explained previously for valves 17 and 18 in the pressure equalization circuit. The purge cross-over conduits 21 and 22 (piped in parallel flow relation) also contain back pressure regulators 23 and 24 oriented in opposite flow directions so as to control flow in either direction between either bed A or B and bed C or D. The back pressure regulators 23 and 24 are set to maintain a minimum pressure, e.g. 50 p.s.i., in the bed undergoing cocurrent depressurization. When this pressure is reached the cocurrent depressurization and purge steps terminate. This arrangement prevents extension of cocurrent depressurization to excessively low pressure with resultant breakthrough of the one component's adsorption front.

As previously indicated, valves 17, 18, 19 and 20 are flow rate limiting devices which prevent bed damage due to excessive ΔP and fluid velocity. A similar precaution may be followed during countercurrent depressurization, by means of preset throttle valve 25 which acts as a bypass around main waste valve 26 in waste conduit 12. During countercurrent depressurization the automatic main waste valve 26 is closed which forces the gas to follow the bypass route through valve 25. During the following lowest pressure purge step, valve 26 opens to minimize flow resistance in the waste conduit 12.

It has been previously indicated that the adsorption step is terminated when the adsorption front of the selected component is entirely within the bed. This point may be determined in a manner well-known to those skilled in the art, using the feed conditions and composition, and the adsorbent's capacity and dynamic characteristics. Also the flow equalization step is stopped when the adsorption front is still entirely within the bed and before breakthrough. This permits removal of the adsorbables from the void space gas by the bed discharge end, so that the emerging equalization gas has virtually the same purity as the product gas. The succeeding cocurrent depressurization step may continue past the breakthrough point as the emerging gas is used for purging only. Breakthrough may for example be identified by monitoring the adsorbable concentration in the discharge gas, and detecting the moment at which this concentration appreciably increases. The purge step is most efficiently performed by removing only the adsorbables deposited in the preceding step. That is, the bed is not completely cleaned of all adsorbables by the purge fluid, but the latter's countercurrent flow insures that the adsorption front is pushed back toward the inlet end. This insures a clean product during even the initial portion of the succeeding adsorption step.

In most uses, the process removes more than one adsorbable component from the feed gas, and the system may be designed to separate the component least strongly held by the adsorbent.

Repressurization conduit 27 having constant flow control valve 28 therein joins product manifold 11 for introduction of unadsorbed product effluent from one adsorber (on the adsorption step) to another adsorber having completed its lowest pressure purge step. Conduit 27 in turn joins product return conduit 29 communicating with repressurization valves 6A–6D joining the product conduits to adsorbers A–D respectively.

The operation of the product repressurization circuit may be illustrated with respect to adsorber A, and the other adsorbers B–D are repressurized in an analogous manner. After adsorber A has completed its lowest pressure purge step, valves 3A and 5A are closed and pressure equalization valve 4AB in conduit 15 is opened to afford the necessary flow communication with adsorber B (initially at a higher pressure). Either simultaneously with or when pressure equalization has been achieved, a portion of the product gas from adsorber C in product manifold 11 is diverted consecutively through conduit 27 and valve 28, conduit 29, and thence through valve 6A for flow into the discharge end of adsorber A. This flow continues until adsorber A has been repressurized to about the product pressure. Feed valve 1A and product valve 2A are, of course, closed throughout repressurization.

Figure 2:
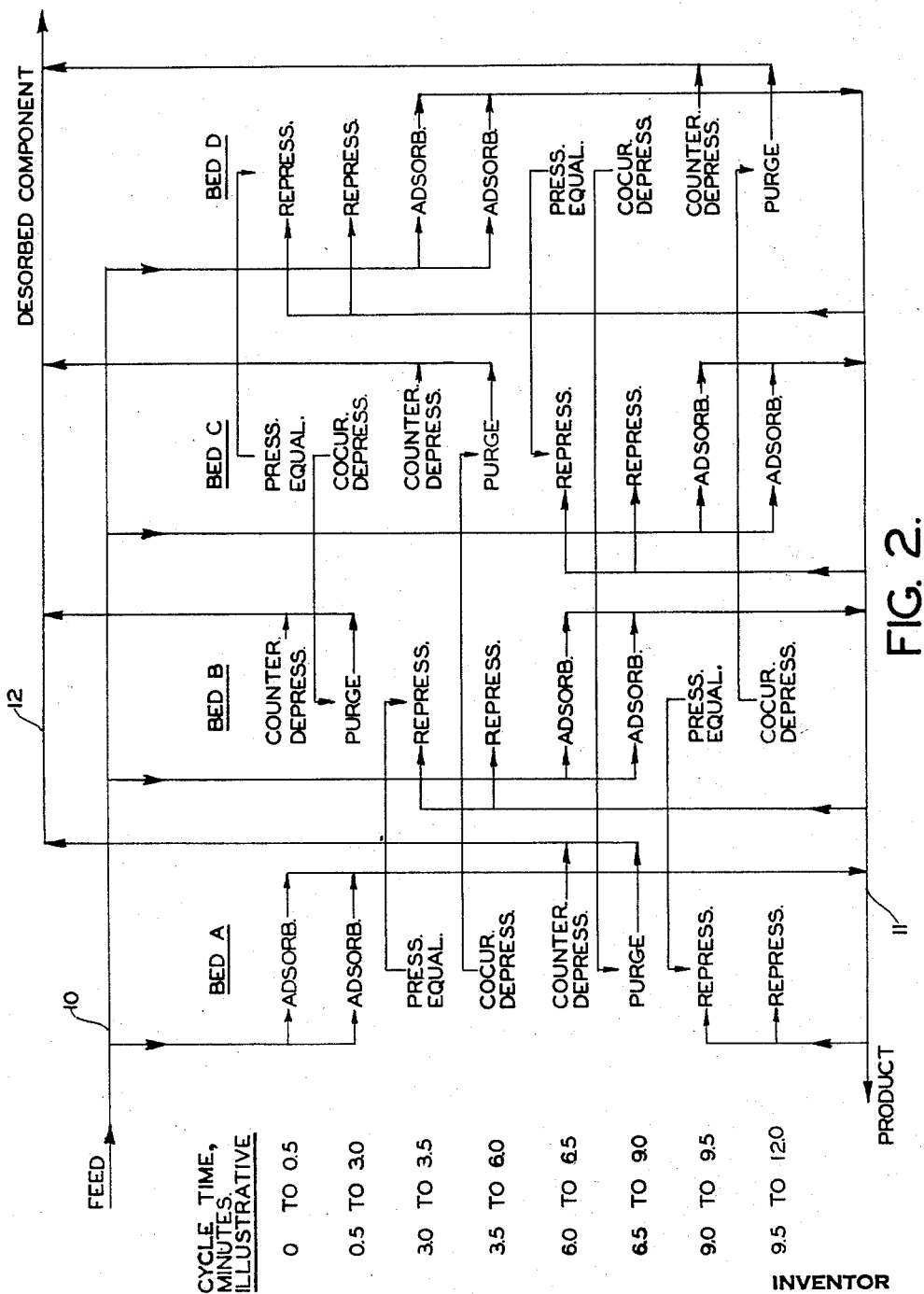
FIG. 2 is a time program for the various steps of this process suitable for use with the FIG. 1 apparatus.

FIG. 2 illustrates one timing sequence suitable for use with the FIG. 1 system to achieve certain objects of this invention: (a) avoid intermediate storage of gas for subsequent use within the process, and (b) realize constant flow and pressure of unadsorbed product effluent.

At least four separate adsorbent beds are required, and the instant process employs six distinct steps each involving commencement and/or termination of flows. Streams flowing into and out of the four-bed system are indicated by vertical lines connecting the feed manifold 10, the unadsorbed product effluent manifold 11 and the desorbate waste manifold 12. The feed manifold 10 connects vertically with each of the four adsorption steps and the latter in turn join vertically with the product manifold 11. The countercurrent depressurization and purge steps, during which the adsorbed component is discharged from the beds, are connected vertically with the desorboate waste manifold 12. The repressurization steps which use a portion of the unadsorbed product effluent are connected vertically with the product manifold 11. All gas flows associated with the four beds are identified on the figure.

At least four adsorbent beds are needed to match, timewise, those steps in which cocurrent depressurization streams become available with those steps which can utilize these streams. Otherwise large hold-up tanks would be required. It will be apparent from FIG. 2 that at any moment of time, one of the adsorbent beds is on its adsorption step delivering product at substantially constant pressure to the product manifold 11. At the same moment the other three beds are being cocurrently depressurized, cleaned of the adsorbed component and repressurized respectively for the succeeding adsorption step. One of the beds is always receiving product gas for repressurization so that the consumption of product for this purpose is continuous rather than intermittent.

In this particular cycle and in terms of any single bed, adsorption accounts for ¼ of the total cycle, pressure equalization and cocurrent depressurization account for ¼, countercurrent depressurization and purge for another ¼, and repressurization for the remaining ¼. The utilization within the system of the cocurrent depressurization gas is indicated by horizontal flow lines, so that each pressure equalization step is connected horizontally with a repressurization step in another bed. Each cocurrent depressurization step is connected horizontally with a purge step in another bed.

Following now the complete cycle for the first bed (Bed A), the feed gas flows thereto for the first 3 minutes and during this same period a portion of the product is withdrawn from the discharge end for flow through product manifold 11. The remaining product portion is directed to the fourth bed (Bed D) as part of the required repressurization gas. It should be noted that the fourth bed is to be the next placed on the adsorption step after the first bed.

On termination of the first bed's adsorption, its pressure is equalized for 0.5 minute with the second bed (Bed B) by cocurrent depressurization of the former and countercurrent repressurization of the latter. Next the first bed is further cocurrently depressurized for 2.5 minutes and the resulting gas is passed directly to the third bed (Bed C) for countercurrent purging thereof. On completion of the cocurrent depressurization step, the first bed has proceeded through one-half of its 12 minute cycle.

For the succeeding 0.5 minute the first bed is countercurrently depressurized and the desorbate discharged from the system through waste manifold 12. For the next 2.5 minutes cocurrent depressurization gas from the fourth bed is passed to the discharge end of the first bed for countercurrent purging thereof, and the resulting purge-desorbate mixture is discharged from the system through waste manifold 12.

The first bed is now clean and may be repressurized during the remaining 3 minutes of the cycle, using both the pressure equalization gas from the second bed and a portion of the product gas from the third bed. These two sources of repressurization gas may be fed to the first bed separately and sequentially, i.e. first introducing the equalization gas to reach an intermediate pressure and then the product gas to substantially final pressure before reintroduction of feed gas. This is advantageous in that it transfers the maximum quantity of void space gas from one bed to another at maximum average pressure, however, operation in this manner has the disadvantage that the cycle will contain a time interval in which product flow for repressurization will be interrupted completely, thereby causing an undesired pressure surge in the product manifold.

In the preferred practice of this invention, this product pressure discontinuity is avoided by simultaneously flowing both pressure equalization gas and product gas to the first bed for repressurization thereof. Initially gas from both sources flows into the bed together, but as pressure builds on the first bed being repressurized and falls in the second bed being equalized, the ΔP promoting equalization gas flow diminishes. As equalization continues the cocurrent depressurization gas comprises a progressively smaller fraction of the total repressurization gas. When equalization pressure is reached, the repressurization gas flow becomes 100% pure product.

Whether the sequential flow or the preferred progressively increasing product fraction method is used, the last portion of the repressurization gas is pure product. This means that the discharge end of the bed is cleaned of adsorbables to a high degree, as traces of same left on the adsorbent at this end are washed toward the inlet end by the countercurrently flowing pure product gas.

Considering now the cycle timing of the entire system, FIG. 2 depicts the sequence of all four adsorbent beds. After the first bed has completed its adsorption step, the fourth bed enters this step and proceeds through the same sequence as previously described in connection with the first bed. However, during the fourth bed's pressure equalization step the discharged gas is countercurrently introduced to the third bed for partial repressurization thereof. Then during the succeeding cocurrent depressurization step the discharged gas is used for countercurrent purging of the first bed. Gas discharged from the second bed during its cocurrent depressurization step serves to countercurrently purge the fourth bed at its lowest pressure level. Fourth bed repressurization gas is supplied by pressure equalization gas from the third bed and product gas from the first bed.

On completion of the fourth bed's adsorption step the second bed enters this step. For pressure equalization, gas is flowed therefrom to the first bed for partial repressurization thereof, as previously described. The gas discharged from the second bed during its cocurrent depressurization step is used to countercurrently purge the fourth bed. The second bed is itself countercurrently purged by gas discharged from the third bed during its cocurrent depressurization step, and partially repressurized by the pressure equalization gas from the first bed. The remaining product gas for repressurization is supplied by the fourth bed.

After the second bed adsorption step, the third bed serves the same function. After its adsorption step has been completed, gas is cocurrently flowed therefrom during the pressure equalization step to partially repressurize the fourth bed. During the succeeding cocurrent depressurization step additional gas is discharged from the third bed and serves to countercurrently purge the second bed. The purge gas for the third bed is supplied by the first bed cocurrent depressurization gas. The third bed repressurization gas is comprised of the fourth bed pressure equalization gas and the second bed product gas.

Summarizing, the adsorption step sequence for the four bed embodiment of this invention as depicted in FIG. 2 is as follows: first, fourth, second and third beds. In the FIG. 1 flowsheet this sequence is beds A, D, B and C.

Figure 3:
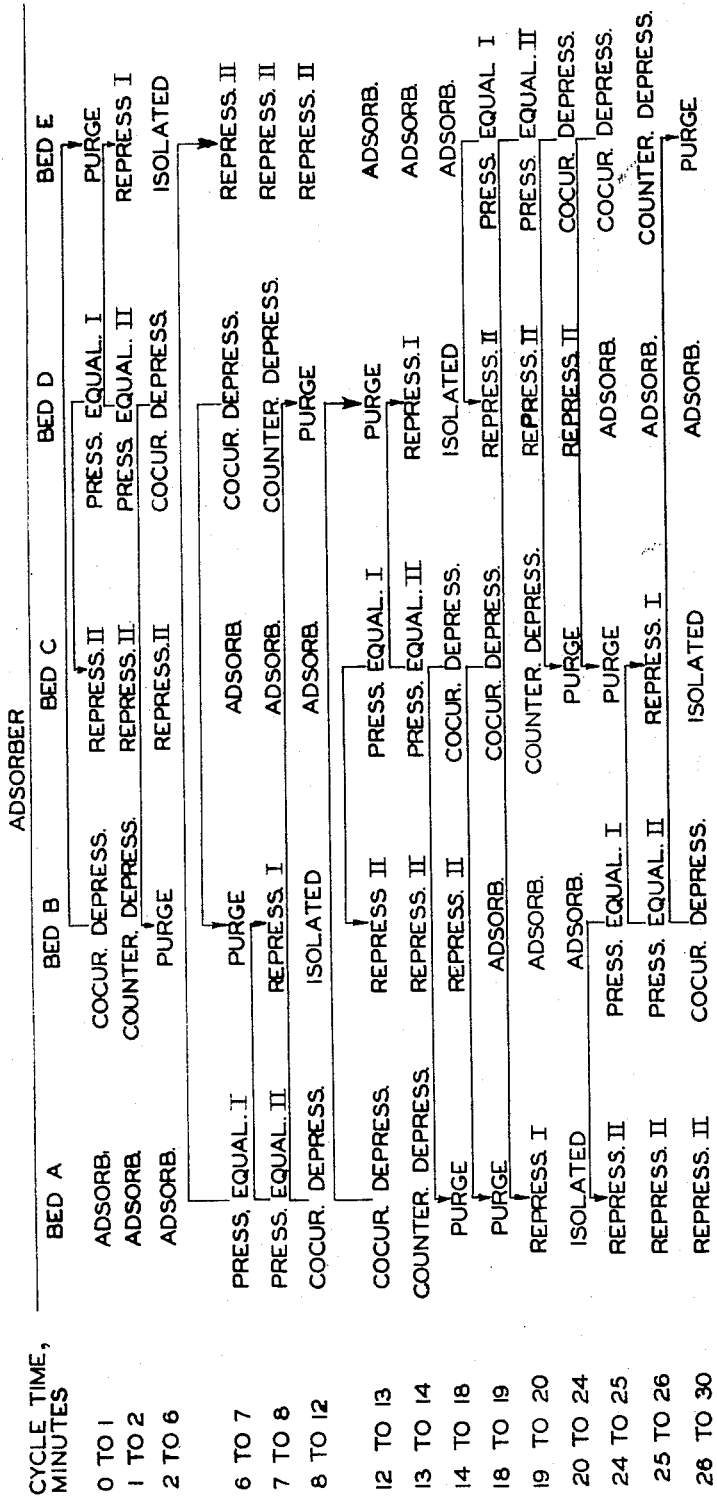
FIG. 3 is a time program suitable for use with five adsorbent beds.
Figure 4:
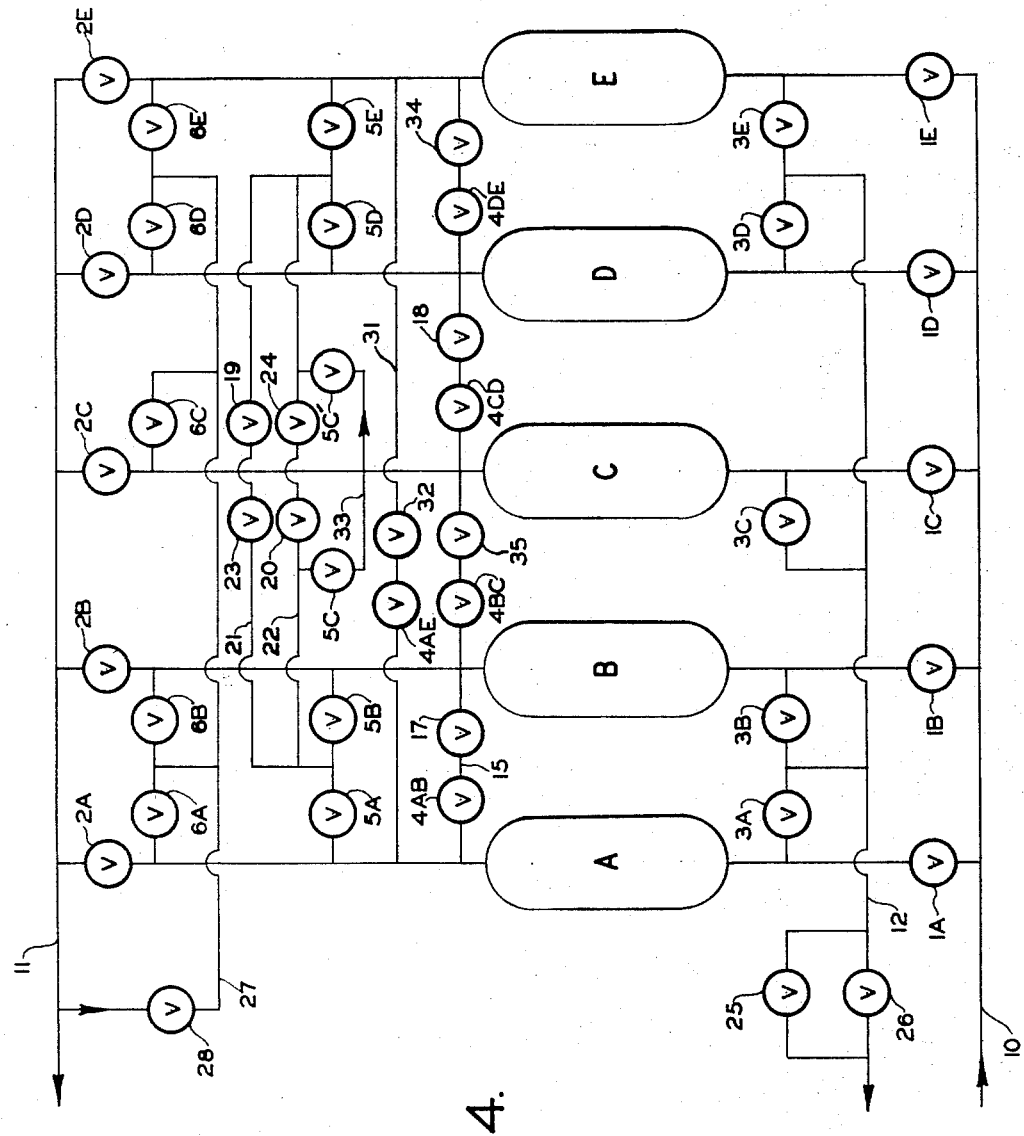
FIG. 4 is a schematic flowsheet of a five adsorbent bed embodiment.

Although the invention has been heretofore described in terms of a four-bed system, it is also applicable to more than four beds. FIG. 3 illustrates a suitable 30 minute cycle sequence chart for a five-bed system, the main difference from FIG. 2 being a two-stage pressure equalization step. That is, the first stage gas discharged from the first bed is directed to the fifth bed for partial countercurrent repressurization thereof, and the second stage gas from the same bed is directed to the second bed for partial countercurrent repressurization of same until pressure equalized with the first bed. Thus the first stage equalization of the first bed is at higher pressure level and is the second stage repressurization of the fifth bed. The second stage equalization of the first bed is at lower pressure level and is the first stage repressurization of the second bed. It is in this sense that the invention broadly requires flowing "at least part" of the released void space gas from the first bed into the discharge end of the second bed. The potential advantage of a five-bed system as compared to a four-bed system is that during pressure equalization the beds are depressurized to lower pressure and are repressurized to higher pressure, which in turn reduces the losses associated with countercurrent depressurization and with product repressurization. That is, more of the void space gas is recovered for repressurizing another adsorber, a smaller portion of this gas is lost with the desorbate, and less product is required to return the adsorber to feed pressure. The potential disadvantage of the five-bed embodiment is the added investment and complexity of a fifth bed. The specific five bed two-stage pressure equalization system described herein and illustrated in FIGS. 3 and 4 is not my invention but claimed in a copending application, "Selective Adsorption Proves," filed Dec. 30, 1968 in the name of Louis B. Batta. This system also incorporates one embodiment of my invention.

After the first bed of the FIG. 3 embodiment has completed its pressure equalization step, further void space gas is released by cocurrent depressurization and directed to the discharge end of the fourth bed for countercurrent purging thereof at the lowest pressure level. In the succeeding countercurrent depressurization step the desorbate is passed from the first bed to the waste manifold for discharge from the system. Next, the first bed is countercurrently purged at its lowest pressure level with void gas discharged from the third bed during its cocurrent depressurization step. The cleaned first bed is now countercurrently partially repressurized with the second stage pressure equalization gas from the fifth bed, and then isolated from the system. When the first stage pressure equalization gas from the second bed becomes available, it is used to further countercurrently repressurize the first bed. Repressurization is completed by product introduction from the fourth bed.

As will be apparent from FIG. 3, a suitable adsorption step sequence for the five-bed embodiment using a 30 minute cycle time is as follows: first, third, fifth, second and fourth beds. The aforedescribed flow interrelations in the five bed embodiment may be related to the broad description in the summary by recognizing that fourth bed D is equivalent to the "other" bed and third bed C is equivalent to "still another" bed.

FIG. 4 illustrates valving and piping suitable for practicing the five-bed embodiment with the flows of FIG. 3. Again using the first bed A as an illustration, during the adsorption step feed gas is introduced through valve 1A and the product emerges from the bed discharge end through discharge valve 2A to product manifold 11. During this step, a portion of the product is returned through valve 28, conduit 27 and valve 6C to the discharge end of third adsorber C for countercurrent repressurization thereof. Next first adsorber A is cocurrently pressure equalized during the first stage with fifth bed E by void space gas flow through conduit 31 having valves 4AE and 32 therein. In the second stage pressure equalization, void space gas is flowed through conduit 15 having valves 17 and 4AB therein to the discharge end of second adsorber bed B.

The first bed A now enters the cocurrently depressurization step as further void space gas is introduced to the discharge end of fourth bed D for countercurrent purging thereof by consecutive flow through valve 5A, conduit 21 and valve 5D to the discharge end of bed D. The desorbate-purge gas mixture is discharged through the bed D inlet end and valve 3D to conduit 12 for release from the system through valve 26.

For the countercurrent depressurization of bed A, valve 3A is opened and the desorbate flows therethrough to waste conduit 12.

To purge first bed A at the lowest pressure level of the system, the cocurrent depressurization gas from the discharge end of third bed C is flowed through conduit 33 and valve 5C' therein to conduit 22 (and valves 20 and 24) for introduction to the bed A discharge end through valve 5A. The desorbate-purge gas mixture emerges from the first bed A inlet for discharge from the system through conduit 12. When desorption is complete, first bed A is partially repressurized by transferring second stage pressure equalization gas from the fifth bed E discharge end to the first bed's discharge end. Such gas flows through conduit 31 and valves 32, 4AE with valves 3A and 5A now closed. When first bed A and fifth bed E have been pressure equalized the partially repressurized first bed A is isolated from the system by closing valve 4AE. When higher pressure equalization gas becomes available in second bed B, this gas is introduced to first bed A for further repressurization by flow through conduit 15 with valves 17 and 4AB therein. Repressurization of first bed A is completed by introduction of product gas from fourth bed D, having flowed consecutively through valve 2D, product manifold 11, conduit 27, valve 28, and valve 6A.

Example 1

A four-bed embodiment was used to purify a hydrogen-rich feed gas mixture supplied at flow rate of 34,200 std. cu. ft./hr., 210 p.s.i.a. and 70° F. (saturated with water). Each adsorbent bend comprised a 36-inch diameter x 88-inch deep activated carbon first section (1470 pounds adsorbent) and a 36-inch x 66-inch deep crystalline zeolitic molecular sieve second section (1650 pounds activated calcium zeolite A). The activated carbon section selectively removed water and $CO_2$ while the molecular sieve section selectively removed CO and $CH_4$, although each adsorbent section removed minor quantities of the other named components. The system was very similar to FIG. 1 and operated on a 32-minute cycle time with hydrogen product flow rate of 20,100 std. cu ft./hr. The time distribution for the six steps of the cycle were approximately as follows:

(1) Adsorption—8 minutes
(2) Pressure equalization (to 125 p.s.i.a.)—1 minute
(3) Cocurrent depressurization (to 65 p.s.i.a.) — 7 minutes
(4) Countercurrent depressurization (to 15 p.s.i.a.)—1 minute
(5) Purge (at 15 p.s.i.a.)—7 minutes
(6) Repressurization (to 200 p.s.i.a.)—8 minutes Of the hydrogen contained in the feed, 76.5% was recovered in the product. The feed and product compositions were as follows:

| | Feed (percent) | Product |
|---|---|---|
| $H_2$ | 77.1 | 99.9999+percent. |
| $CH_4$ | 0.013 | Not detectable (<½ p.p.m.). |
| CO | 0.35 | Not detectable (<¼ p.p.m.). |
| $CO_2$ | 22.5 | Do. |
| $H_2O$ | Saturated | Dry (<−100° F. dew point). |

Example 2

Another four-bed embodiment similar to FIG. 1 was used in which the beds each contained only 1800 pounds of activated calcium zeolite A. The beds were 30-inch diameter x 103-inches deep and switched on a 48 minute cycle with hydrogen-rich feed gas, the time distribution for the six steps being as follows:

(1) Adsorption—12 minutes
(2) Pressure equalization (to 165 p.s.i.a.)—2 minutes
(3) Cocurrent depressurization (to 90 p.s.i.a.)—10 minutes
(4) Countercurrent depressurization (to atmospheric)— 2 minutes
(5) Purge (at atmospheric)—10 minutes
(6) Repressurization (to 285 p.s.i.a.)—12 minutes The feed gas was about 99.7% $H_2$, 0.3% light saturated aliphatic hydrocarbons and saturated with water at feed conditions, the adsorption step conditions being 10,500 std. c.f.h., 295 p.s.i.a. and 75° F. The product flow rate was 8,100 std. c.f.h. 295 p.s.i.a. and comprised 99.9999% $H_2$.

Examples 1 and 2 demonstrate a combination of high product recovery and extraordinarily high product purity which has not been possible with prior art adiabatic pressure swing processes These prior art processes when operated with economically sized adsorbent beds at 70-80% recovery have produced hydrogen from such feeds of only 95-98% purity. The superlative performance of this invention is attributed in large measure to separation of the void space gas in the clean section of the beds, downstream of the adsorption front and to the optimized usage of such gas to satisfy repressurization and purge requirements. Such optimized usage without high investment is in turn dependent upon the removal of restraint imposed upon the system by the need for interim storage of the void space gas.

During operation of the system in Example 1 above, the product pressure was observed to vary only about 5 to 10 p.s.i. on an average total pressure of about 190 p.s.i.g. This is quite tolerable, and the product was fed directly to the suction of a compressor without surge tankage. The flow variation corresponding to this pressure fluctuation is estimated to be about 5% to 10%. Product gas diverted for repressurization amounted to about 9000 c.f.h. (steady flow), or about 31% of the total product effluent: 9000/(9000+20,100). By comparison if the beds had been repressurized in half the time with twice the flow rate of gas, there would be periods of "zero" product diversion. The flow in the product manifold would fluctuate between 11,100 c.f.h. and 29,100 c.f.h., or +45% of the average, as compared to 5% to 10% fluctuation for this invention.

Although certain embodiments have been described in detail, it will be appreciated that other embodiments are contemplated along with modifications of the disclosed features, as being within the scope of the invention.

For example, although activated carbon and calcium zeolite A have been described as adsorbents, the selection of a suitable adsorbent depends on such well-known factors as the composition of the feed gas to be separated, and is not part of this invention. Also, although the unadsorbed effluent has been described as the product gas, in some systems it may be desirable to recover the adsorbate as product.

The invention has been specifically described for separating gas mixtures in which hydrogen is the major constituent and the process is intended to remove all impurities as selectively adsorbable components. These have included light hydrocarbons, CO, $CO_2$, $NH_3$, $H_2S$, A and water. Hydrogen-rich feed gas containing at least one of these adsorbable components include: catalytic reformer off-gas, methanol synthesis loop purge, dissociated ammonia and demethanizer overhead gas, steam reformed hydrocarbons, ammonia synthesis loop purge gas, electrolytic hydrogen and mercury cell hydrogen. The invention is also useful for separating any or all of the aforementioned adsorbables from gas mixtures in which nitrogen or helium is the primary constituent.

What is claimed is:

1. In an adiabatic process for separating gas mixture by selectively adsorbing at least one gas component in an adsorption zone at higher pressure and desorbing the selected component by pressure reduction to lower pressure, the improvement comprising the steps of (a) providing at least four beds of selective adsorbent material each with inlet and discharge ends;

(b) introducing said gas mixture to the inlet end of a first adsorbent bed at first highest superatmospheric pressure for flow therethrough with selective adsorption of at least one component and discharge of unadsorbed product effluent from the discharge end, continuing such flow so that an adsorption front of said one component is established at said inlet end and moves progressively toward the discharge end, and terminating such flow when said adsorption front is entirely within said first bed so that the bed remains filled with void space gas at said first highest pressure;

(c) releasing part of said void space gas from the first bed discharge end cocurrent to the preceding gas mixture flow and flowing at least part of such gas directly into the discharge end of a second adsorbent bed previously cleaned of said one component and initially at a lower pressure, and continuing said releasing and flowing until said first and second beds are pressure equalized at second intermediate pressure so that said adsorption front has moved closer toward without reaching said discharge end;

(d) releasing further void space gas from the first bed discharge end cocurrent to the preceding gas mixture flow, throttling such gas to a lowest pressure and flowing same into the discharge end of another adsorbent bed partially loaded with said one component for purging thereof, and continuing such further releasing until the first bed is at third lower-than-intermediate pressure and the other bed is at least partially cleaned of said one component;

(e) reducing the inlet end pressure of said first adsorbent bed thereby countercurrently desorbing part of the adsorbed one component and discharging same through said inlet end, and continuing the discharge until said first bed is at said lowest pressure;

(f) introducing cocurrent depressurization gas from still another adsorbent bed at said lowest pressure to the discharge end of said first adsorbent bed for flow therethrough countercurrent to the previously flowing gas mixture so as to purge at least part of the remaining adsorbed one component and remove same through the bed inlet end;

(g) introducing void space gas from said second adsorbent bed and product effluent from said other adsorbent bed to the discharge end of the purged first adsorbent bed for countercurrent repressurization of same from said lowest pressure to a higher pressure, such that the last part of repressurization is performed with only said product effluent;

(h) reintroducing said gas mixture to the inlet end of the repressurized first bed in a manner analogous to step (b) and thereafter consecutively repeating steps (c) through (g); and (i) consecutively following the sequence of steps (b) through (h) with said still another, second and other beds.

2. A process according to claim 1 in which said void space gas and product effluent are simultaneously introduced at the start of step (g) and the ratio of two flows progressively varies to increase the proportion of product effluent and decrease the proportion of void space gas.

3. A process according to claim 1 in which product effluent is continuously flowed to one of the adsorbent beds for repressurization after purging, during the sequencing of each bed in steps (b) through (h).

4. A process according to claim 1 in which the duration of the further void gas cocurrent discharge step (d) and the countercurrent purge gas step (f) are the same.

5. A process according to claim 1 in which product effluent is continuously flowed to one of the four adsorbent beds for repressurization after purging, and such continuous flow is at substantially constant mass rate.

6. A process according to claim 1 in which said gas mixture comprises hydrogen as the product and major component and carbon dioxide as the selectively adsorbable one component.

7. A process according to claim 1 in which said gas mixture comprises hydrogen as the product and major component, and light aliphatic hydrocarbons as the selectively adsorbable one component.

8. A process according to claim 1 in which said gas mixture comprises hydrogen as the product and major component, a member of the group consisting of water and carbon dioxide as the selectively adsorbable one component, additionally contains a member selected from the group consisting of methane, carbon monoxide and nitrogen as a minor selectively adsorbable component, and the four adsorbent beds each comprise an activated carbon section at the inlet end for removing said one component and a crystalline zeolitic molecular sieve section at the discharge end for removing the minor component.

9. In an adiabatic process for separating gas mixture by selectively adsorbing at least one gas component in an adsorption zone at higher pressure and desorbing the selected component by pressure reduction to lower pressure, the improvement comprising the steps of (a) providing four beds of selective adsorbent material each with inlet and discharge ends;

(b) introducing sad gas mixture to the inlet end of a first adsorbent bed at first highest superatmospheric pressure for flow therethrough with selective adsorption of at least one component and discharge of unadsorbed product effluent from the discharge end, continuing such flow so that an adsorption front of said one component is established at said inlet end and moves progressively toward the discharge end, and terminating such flow when said adsorption front is entirely within said first bed so that the bed remains filled with void space gas at said first highest pressure;

(c) releasing part of said void space gas from the first bed discharge end cocurrent to the preceding gas mixture flow and flowing at least part of such gas directly into the discharge end of a second adsorbent bed previously cleaned of said one component and initially at a lower pressure, and continuing said releasing and flowing until said first and second beds are pressure equalized at second intermediate pressure so that said adsorption front has moved closer toward without reaching said discharge end;

(d) releasing further void space gas from the first bed discharge end cocurrent to the preceding gas mixture flow, throttling such gas to a lowest pressure and flowing same into the discharge end of a third adsorbent bed partially loaded with said one component for purging thereof, and continuing such further releasing until the first bed is at third lower-than-intermediate pressure and the third bed is at least partially cleaned of said one component;

(e) reducing the inlet end pressure of said first adsorbent bed thereby countercurrently desorbing part of the adsorbed one component and discharging same through said inlet end, and continuing the discharge until said first bed is at said lowest pressure;

(f) introducing cocurrent depressurization gas from a fourth adsorbent bed at said lowest pressure to the discharge end of said first adsorbent bed for flow therethrough countercurrent to the previously flowing gas mixture so as to purge at least part of the remaining adsorbed one component and remove same through the bed inlet end;

(g) introducing void space gas from said second adsorbent bed and product effluent from said third adsorbent bed to the discharge end of the purged first adsorbent bed for countercurrent repressurization of same from said lowest pressure to a higher pressure, such that the last part of repressurization is performed with only said product effluent;

(h) reintroducing said gas mixture to the inlet end of the repressurized first bed in a manner analogous to step (b) and thereafter consecutively repeating steps (c) through (g); and (i) consecutively following the sequence of steps (b) through (h) with the fourth, second and third beds.

References Cited

UNITED STATES PATENTS

| | | | |
|---|---|---|---|
| 2,992,703 | 7/1961 | Vasan et al. | 55—62 |
| 3,142,547 | 7/1964 | Marsh et al. | 55—62 |
| 3,176,444 | 4/1965 | Kiyonaga | 55—58 |
| 3,338,030 | 8/1967 | Feldbauer | 55—62 |

REUBEN FRIEDMAN, *Primary Examiner.*

C. N. HART, *Assistant Examiner.*

U.S. Cl. X.R.

55—62